United States Patent [19]

Sutter, Jr.

[11] Patent Number: 5,095,490
[45] Date of Patent: Mar. 10, 1992

[54] ASYMMETRIC RF EXCITED GAS LASER ELECTRODE CONFIGURATION

[75] Inventor: Leroy V. Sutter, Jr., Irvine, Calif.

[73] Assignee: Directed Energy, Inc., Irvine, Calif.

[21] Appl. No.: 542,813

[22] Filed: Jun. 22, 1990

[51] Int. Cl.⁵ ............................................. H01S 3/097
[52] U.S. Cl. ...................................... 372/82; 372/83; 372/87; 372/93
[58] Field of Search ................ 372/82, 61, 93, 83, 372/38, 87

[56] References Cited

U.S. PATENT DOCUMENTS

| 4,500,996 | 2/1985 | Sasnett et al. | 372/93 |
| 4,719,639 | 1/1988 | Tulip | 372/82 |
| 4,805,072 | 2/1989 | Ackermann et al. | 372/82 |
| 4,891,819 | 1/1990 | Sutter et al. | 372/82 |

FOREIGN PATENT DOCUMENTS 0286376 11/1989 Japan ...................................... 372/61

Primary Examiner—James W. Davie
Attorney, Agent, or Firm—W. Edward Johansen

[57] ABSTRACT

An asymmetric RF excited gas laser includes an elongated chamber, a first reflector and a second reflector, a first supporting mechanism, a ribbon of a metal conductor and a impedance-matching circuit. The elongated chamber is of cross-sectional dimensions suitable for confining a laser gas discharge and is formed from a dielectric material. A laser gas is disposed in the elongated chamber. The first and second reflector reflect and guide light energy from the laser gas discharge within the elongated chamber so that the light energy is optically independent of the internal walls of the elongated chamber as the light energy travels longitudinally the length of the elongated chamber. The first supporting mechanism supports the elongated chamber and forms negative electrode. The first supporting mechanism has cooling tubes and is electrically coupled to ground. The ribbon of the metal conductor forms a positive electrode which is disposed along the elongated chamber. An RF energy generator applies a voltage of alternating polarity to the positive electrode at a frequency ranging from 10 Mhz to about 3 Ghz in order to establish a laser gas discharge in the laser gas. An impedance-matching circuit matches the impedance of the elongated chamber and the positive electrode to the impedance of the RF energy generator.

6 Claims, 2 Drawing Sheets

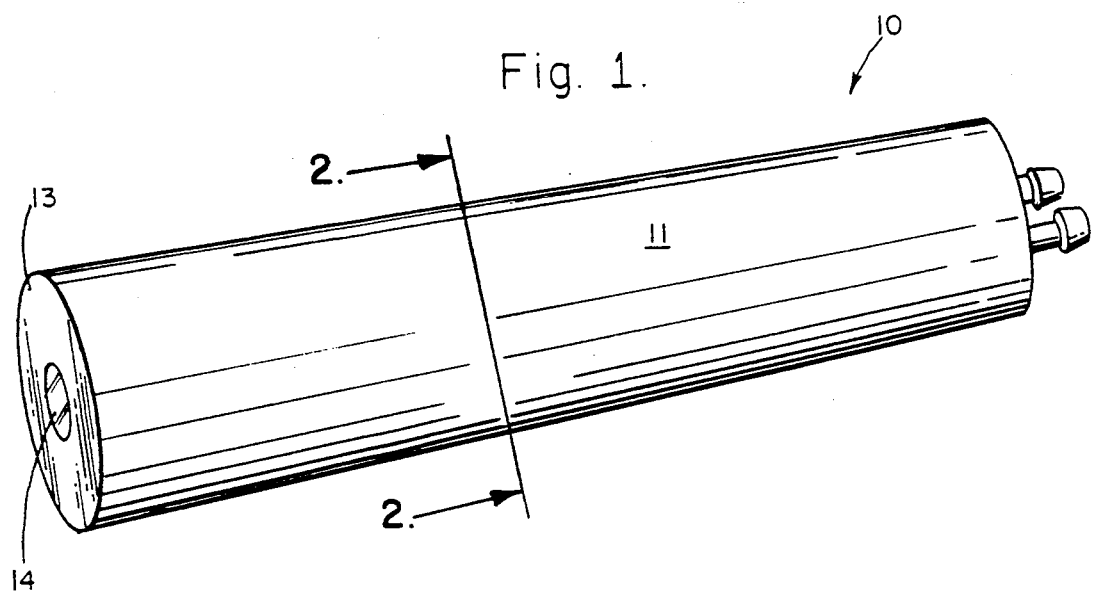
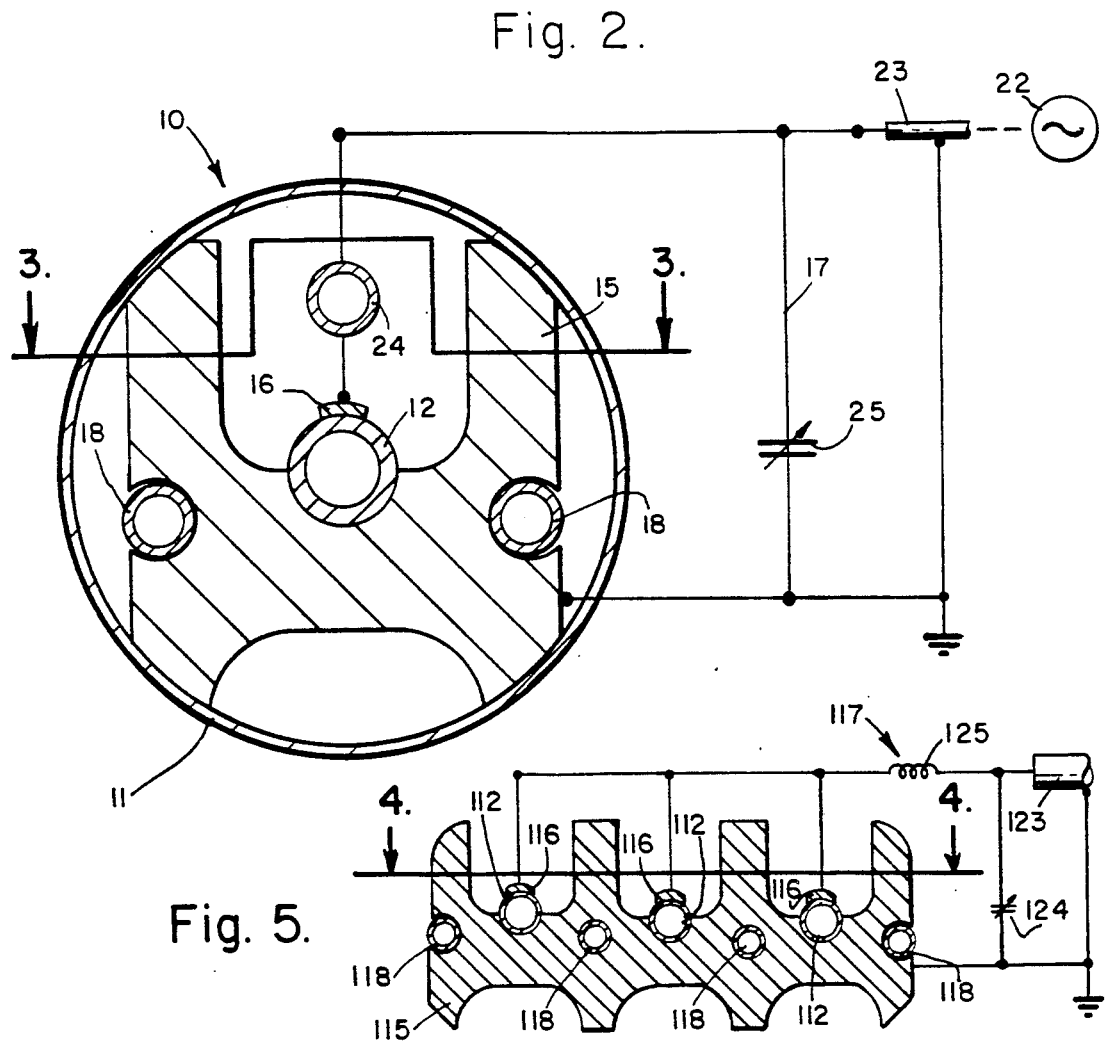

ASYMMETRIC RF EXCITED GAS LASER ELECTRODE CONFIGURATION

BACKGROUND OF THE INVENTION

1. Field of the Invention

This invention relates to an RF excited gas laser and more particularly to an RF excited gas laser having an asymmetric dipolar electrode configuration which includes a positive electrode and a negative electrode with cooling tubes and which utilizes a matching network which consists of only an inductor and a variable capacitor.

2. Description of the Prior Art

U.S. Pat. No. 4,891,819, entitled RF Excited Laser with Internally Folded Resonator, issued to Leroy V. Sutter, Jr. and Harold A. Cameron on Jan. 2, 1990, teaches a transversely RF excited gas laser with an internally folded resonator which includes an elongated chamber of cross-sectional dimensions suitable for confining a laser gas discharge, a plurality of reflectors and a laser gas. The reflectors form a stable folded laser resonator cavity of a compact geometry in order to efficiently extract laser power from the laser resonator cavity. There are at least two of the reflectors and at least one of the plurality of reflectors is concave. The laser gas is disposed in the folded resonator cavity which reflect and guide light energy from the laser gas discharge within the elongated chamber. The transversely RF excited gas laser with an internally folded resonator also includes a pair of electrodes and a pair of cooling electrodes. The electrodes are transversely disposed on the elongated chamber and excite the laser gas. The cooling electrodes are transversely disposed on the elongated chamber and electrically coupled to ground. The impedance-matching circuit applies RF power to the electrodes. The impedance-matching circuit includes three inductors with a center-tapped coil being adjusted so that the voltage potential at the center of the laser discharge between the pair of cooling electrodes is a virtual ground thereby preventing RF current from passing through the grounded cooling electrodes in order to efficiently extract laser power from the laser resonator cavity.

U.S. Pat. No. 4,464,760, entitled Elongated Chamber for Use in Combination with a Transversely Excited Gas Laser, issued to Leroy V. Sutter, Jr. on Aug. 7, 1984, teaches an laser bore and electrode structure which includes a ceramic bore, a pair of active electrodes and a pair of cooling electrodes. The active electrodes are electrically coupled to an RF generator through a matching network. The cooling electrodes are grounded.

U.S. Pat. No. 4,500,996, entitled High Power Fundamental Mode Laser, issued to Michael W. Sasnett, James L. Hobart and Larry A. Gibson on Feb. 19, 1985, teaches a high power, fundamental mode gaseous laser which has a discharge-confining bore tube which is provided with spaced-apart annular, inwardly-extending, radial projections which have inside diameters which match the fundamental mode diameter along the tube.

SUMMARY OF INVENTION

In view of the foregoing factors and conditions which are characteristic of the prior art it is the primary object of the present invention to provide an RF excited gas laser having an asymmetric dipolar electrode configuration.

It is another object of the present invention to provide an RF excited gas laser having an asymmetric dipolar electrode configuration which utilizes a matching network which consists of only an inductor and a variable capacitor.

It is still another object of the present invention to provide an RF excited gas laser having an asymmetric dipolar electrode configuration which has an externally folded resonator cavity.

In accordance with the present invention an embodiment of an asymmetric RF excited gas laser having a first electrode configuration is described. The asymmetric RF excited gas laser includes an elongated chamber, a first reflector and a second reflector, a first supporting mechanism, a ribbon of a metal conductor and a impedance-matching circuit. The elongated chamber is of cross-sectional dimensions suitable for confining a laser gas discharge and is formed from a dielectric material. A laser gas is disposed in the elongated chamber. The first and second reflector reflect and guide light energy from the laser gas discharge within the elongated chamber so that the light energy is optically independent of the internal walls of the elongated chamber as the light energy travels longitudinally the length of the elongated chamber. The first supporting mechanism supports the elongated chamber and forms a negative electrode. The first supporting mechanism has cooling tubes and is electrically coupled to ground. The ribbon of the metal conductor forms a positive electrode which is disposed along the elongated chamber. An RF energy generator applies a voltage of alternating polarity to the positive electrode at a frequency ranging from 10 MHz to about 3 GHz in order to establish a laser gas discharge in the laser gas. An impedance-matching circuit matches the impedance of the elongated chamber and the positive electrode to the impedance of the RF energy generator.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE DRAWING

FIG. 1 is a perspective drawing of a first asymmetric RF excited gas laser having a first electrode configuration which includes a first supporting mechanism which incorporates cooling tube and which is electrically coupled to ground and a ribbon of a metal conductor which is electrically coupled through a first matching circuit and which have been constructed in accordance with the principles of the first embodiment of the present invention.

FIG. 2 is a transverse cross-sectional view of the first supporting mechanism of the first electrode configuration of FIG. 1.

FIG. 5 is a transverse cross-sectional view of the second supporting mechanism of the second electrode configuration of FIG. 4.

DESCRIPTION OF THE PREFERRED EMBODIMENT

Figure 3:
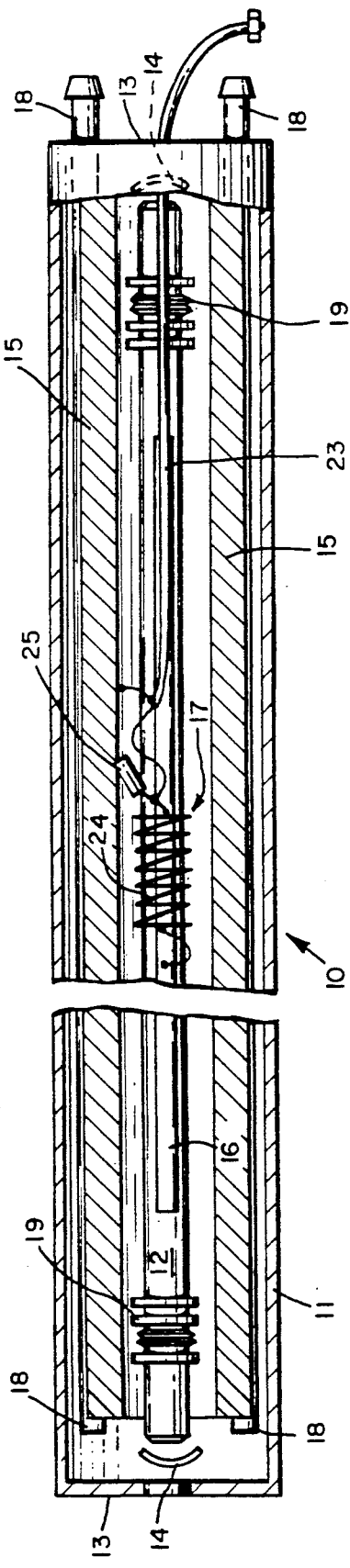
FIG. 3 is a partial top plan view in cross-section of the first supporting mechanism, the elongated chamber and the end blocks of the first asymmetric RF excited gas laser of FIG. 1.

In order to best understand the present invention it is necessary to refer to the following description of its preferred embodiment in conjunction with the accompanying drawing. Referring to FIG. 1 in conjunction with FIG. 2 and FIG. 3 a first asymmetric RF excited gas laser 10 having a first electrode configuration includes a first housing 11, an elongated chamber 12, two end blocks 13 each having a reflector 14, a first supporting mechanism 15 and a ribbon 16 of a metal conductor and a first impedance-matching circuit 17. The first supporting mechanism 15 incorporates cooling tubes 18 and is electrically coupled to ground. The ribbon 16 of the metal conductor is electrically coupled through the first impedance-matching circuit 17. The elongated chamber 12 is of a cross-sectional dimension suitable for confining a laser gas discharge. The elongated chamber 12 is formed from a dielectric material, such as BeO, $Al_2O_3$ or glass. The first supporting mechanism 15 supports the elongated chamber 12. A bellow 19 fluidly couples the elongated chamber 12 to the end block 13. The first supporting mechanism 15 incorporates cooling tubes 20 and is electrically coupled to ground. A ribbon 21 of a metal conductor is electrically coupled through the first impedance-matching circuit 17. The first impedance-matching circuit 17 is electrically coupled to a first RF generator 22 by a coaxial connector 23. The first impedance-matching circuit 17 includes a series input coil 24 and a tuning capacitor 25. The first RF generator 22 applies an alternating electric field at a frequency ranging from 10 MHz to about 3 GHz through the first impedance-matching circuit 17 to each ribbon 21 of metal conductor forming a positive electrode which is disposed along the elongated chamber 12 in order to establish a laser gas discharge in a laser gas 26. The elongated chamber 12 may either be sealed off or be utilized in a flowing gas system.

The inventor with Harold A. Cameron filed an application, entitled RF Excited Laser with an Externally Folded Resonator Cavity on Jun. 31, 1989 under Ser. No. 359,780, which teaches an RF excited gas laser with an externally folded resonator. The RF excited gas laser includes a housing, a plurality of elongated chambers, a supporting mechanism, a plurality of pairs of end blocks, a folded reflecting system, plurality of pairs of positive electrodes, a plurality of cooling electrodes and an impedance-matching circuit. Each elongated chamber is of a cross-sectional dimension suitable for confining a laser gas discharge and all of them are disposed in the housing. The supporting mechanism supports the elongated chambers so that they are parallelly disposed. The folded reflecting system serially reflect light energy from the laser gas discharge. The pairs of end blocks externally mount the folded reflecting system to the supporting mechanism so that the folded reflecting system forms an enclosed, folded resonator cavity which reflects and guides the light energy. A laser gas is disposed in the enclosed, folded resonator cavity. Each pair of positive electrodes is longitudinally disposed on one of the elongated chambers. Each cooling electrode which is an integral part of the housing is longitudinally disposed on one of the elongated chambers and is electrically coupled to ground. The impedance-matching circuit applies RF power to each pair of electrodes in order to transversely excite the laser gas.

Figure 4:
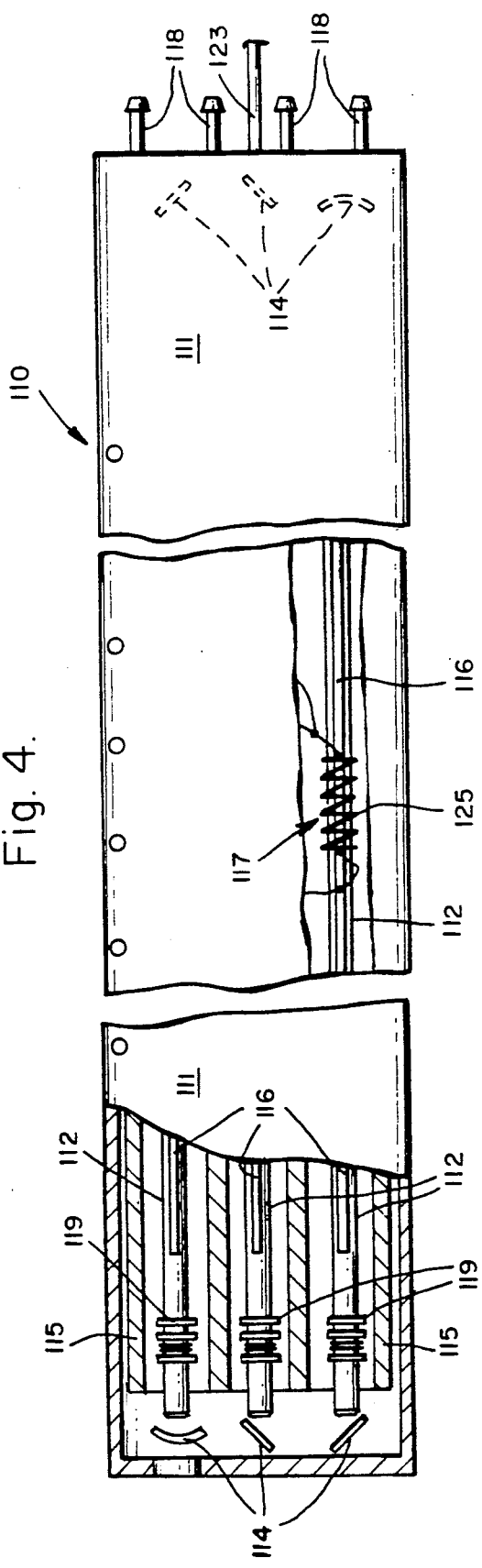
FIG. 4 is a top plan view of a second RF asymmetric excited gas laser which includes an externally folded resonator cavity, three elongated chambers, a second supporting mechanism, a second housing and two three-pass end blocks and which has a second electrode configuration which includes a second supporting mechanism which incorporates cooling tube and which is electrically coupled to ground and a ribbon of a metal conductor which is electrically coupled through a second matching circuit and which have been constructed in accordance with the principles of the second embodiment of the present invention.

Referring to FIG. 4 in conjunction with FIG. 5 a second asymmetric RF excited gas laser 110 having a second electrode configuration includes a first housing 111, three elongated chambers 112, two three-pass end blocks 113 each of which having three reflectors 114 which form an externally folded resonator cavity, a second supporting mechanism 115 and a ribbon 116 of a metal conductor and a second matching circuit 117. The second supporting mechanism 115 incorporates cooling tubes 118 and is electrically coupled to ground. The ribbon 116 of the metal conductor is electrically coupled through the second impedance-matching circuit 117. Each elongated chamber 112 is of a cross-sectional dimension suitable for confining a laser gas discharge. A bellows 119 fluidly couples each of the elongated chambers 112 to one of the three-pass end block 113. Each elongated chamber 112 is formed from a dielectric material, such as BeO, $Al_2O_3$ or glass. The first second mechanism 115 supports the three elongated chambers 112 so that the three elongated chambers 112 are parallelly disposed and fluidly coupled to each other. One of three bellows 119 fluidly couples each of the three elongated chamber 112 to one of the three-pass end block 113. The second supporting mechanism 115 incorporates cooling tubes 120 and is electrically coupled to ground. A ribbon 121 of a metal conductor is electrically coupled through the second matching circuit 117. The second impedance-matching circuit 117 is electrically coupled to a second RF generator 122 by a coaxial connector 123. The second impedance-matching circuit 117 includes a series input coil 124 and a tuning capacitor 125. The second RF generator 122 applies an alternating electric field at a frequency ranging from 10 MHz to about 3 GHz through the second impedance-matching circuit 117 to each ribbon 121 of metal conductor forming a positive electrode along a direction transverse to each elongated chamber 112 in order to establish a laser gas discharge in a laser gas 126. The three elongated chamber 112 may either be sealed off or be utilized in a flowing gas system.

From the foregoing it can be seen that an electrode configuration of an asymmetric RF excited gas has been described. It should be noted that the sketches are not drawn to scale and that distance of and between the figures are not to be considered significant.

Accordingly it is intended that the foregoing disclosure and showing made in the drawing shall be considered only as an illustration of the principles of the present invention.

What is claimed is:

1. An asymmetric configuration of electrode means for use in a transversely excited gas laser which includes:
    a. an elongated chamber of cross-sectional dimensions suitable for confining a laser gas discharge, said elongated chamber being formed from a dielectric material;
b. a laser gas disposed in said elongated chamber;
c. first and second reflecting means for reflecting and guiding light energy from said laser gas discharge within said elongated chamber so that said light energy is optically independent of the internal walls of said elongated chamber as said light energy travels longitudinally the length of said elongated chamber;
d. first supporting means for supporting said elongated chamber and forming a negative electrode, said first supporting means having cooling tubes and being electrically coupled to ground;
e. a ribbon of a metal conductor which forms a positive electrode which is longitudinally disposed along said elongated chamber;
f. energy means for applying a voltage of alternating polarity to said positive electrode at a frequency ranging from 10 MHz to about 3 GHz in order to establish a laser gas discharge in said laser gas; and
g. impedance-matching means for matching the impedance of said elongated chamber and said positive electrode to the impedance of said energy means.

2. An asymmetric configuration of electrode means for use in a transversely excited gas laser according to claim 1 wherein said elongated chamber is sealed off.

3. An asymmetric configuration of electrode means for use in a transversely excited gas laser according to claim 1 wherein said elongated chamber is utilized in a flowing gas system.

4. An asymmetric configuration of electrode means for use in a transversely excited gas laser which includes:

a. a housing;
b. a plurality of elongated chambers each of which is of a cross-sectional dimension suitable for confining a laser gas discharge and all of which are disposed in said housing;
c. first supporting means for supporting each of said elongated chambers and forming a negative electrode, said first supporting means having cooling tubes and is electrically coupled to ground;
d. a ribbon of a metal conductor which forms a positive electrode which is longitudinally disposed along each of said elongated chambers;
e. folded reflecting means for serially reflecting light energy from said laser gas discharge;
f. a plurality of pairs of end blocks which externally mount said folded reflecting means to said supporting means so that said folded reflecting means forms an enclosed, folded resonator cavity which reflects and guides said light energy;
g. a laser gas disposed in said elongated chambers;
h. energy means for applying a voltage of alternating polarity to said positive electrode at a frequency ranging from 10 MHz to about 3 GHz in order to establish a laser gas discharge in said laser gas; and
i. impedance-matching means for matching the impedance of said elongated chamber and said positive electrode to the impedance of said energy means.

5. An asymmetric configuration of electrode means for use in a transversely excited gas laser according to claim 4 wherein said elongated chamber is sealed off.

6. An asymmetric configuration of electrode means for use in a transversely excited gas laser according to claim 4 wherein said elongated chamber is utilized in a flowing gas system.

* * * * *